(12) United States Patent
Lin et al.

(10) Patent No.: US 12,086,904 B2
(45) Date of Patent: Sep. 10, 2024

(54) REALITY IMAGE RECONSTRUCTION SYSTEM

(71) Applicant: ADATA TECHNOLOGY CO., LTD., New Taipei (TW)

(72) Inventors: Chi-Chien Lin, Keelung (TW); Yuliang Chen, Chiayi (TW); Tienyun Miao, Taoyuan (TW); Chia-Hsiang Hsiao, New Taipei (TW)

(73) Assignee: ADATA TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/008,676

(22) PCT Filed: May 17, 2022

(86) PCT No.: PCT/CN2022/093223
§ 371 (c)(1),
(2) Date: Dec. 7, 2022

(87) PCT Pub. No.: WO2023/220908
PCT Pub. Date: Nov. 23, 2023

(65) Prior Publication Data
US 2024/0233201 A1     Jul. 11, 2024

(51) Int. Cl.
*G06T 11/00* (2006.01)
*G06F 3/01* (2006.01)
*G06V 20/58* (2022.01)

(52) U.S. Cl.
CPC .............. *G06T 11/00* (2013.01); *G06F 3/011* (2013.01); *G06V 20/58* (2022.01)

(58) Field of Classification Search
CPC ..... H04L 67/1097; G06V 20/58; G06T 11/00; G06F 3/011
See application file for complete search history.

(56) References Cited

U.S. PATENT DOCUMENTS

| | | | |
|---|---|---|---|
| 2003/0212536 A1 | 11/2003 | Wang et al. | |
| 2021/0118183 A1* | 4/2021 | Lin | G06V 10/25 |

FOREIGN PATENT DOCUMENTS

| | | |
|---|---|---|
| CN | 105654800 A | 6/2016 |
| CN | 106648045 A | 5/2017 |

(Continued)

*Primary Examiner* — Abbas I Abdulselam

(57) ABSTRACT

A reality image reconstruction system includes: a sensing device for sensing an outdoor environment and objects therein to generate environmental parameters of the outdoor environment and object parameters of said objects; a cloud server for receiving the environmental parameters of the outdoor environment, the object parameters of said objects, and movement parameters of the sensing device to establish prediction parameters and physical parameters of said objects in the outdoor environment; a simulation device for establishing a virtual environment synchronized with the outdoor environment according to the environmental parameters of the outdoor environment, the object parameters, the prediction parameters and the physical parameters of said objects; and an interactive device for interacting with said objects realistically in the virtual environment according to the environmental parameters of the outdoor environment, the object parameters, the prediction parameters and the physical parameters of said objects, and the movement parameters of the sensing device.

10 Claims, 1 Drawing Sheet

(56) References Cited

FOREIGN PATENT DOCUMENTS

| CN | 107329268 | A | 11/2017 |
|----|-----------|---|---------|
| CN | 110221691 | A | 9/2019 |
| CN | 114434458 | A | 5/2022 |
| TW | 201743165 | A | 12/2017 |
| TW | M582983 | U | 9/2019 |
| TW | 202121124 | A | 6/2021 |

* cited by examiner

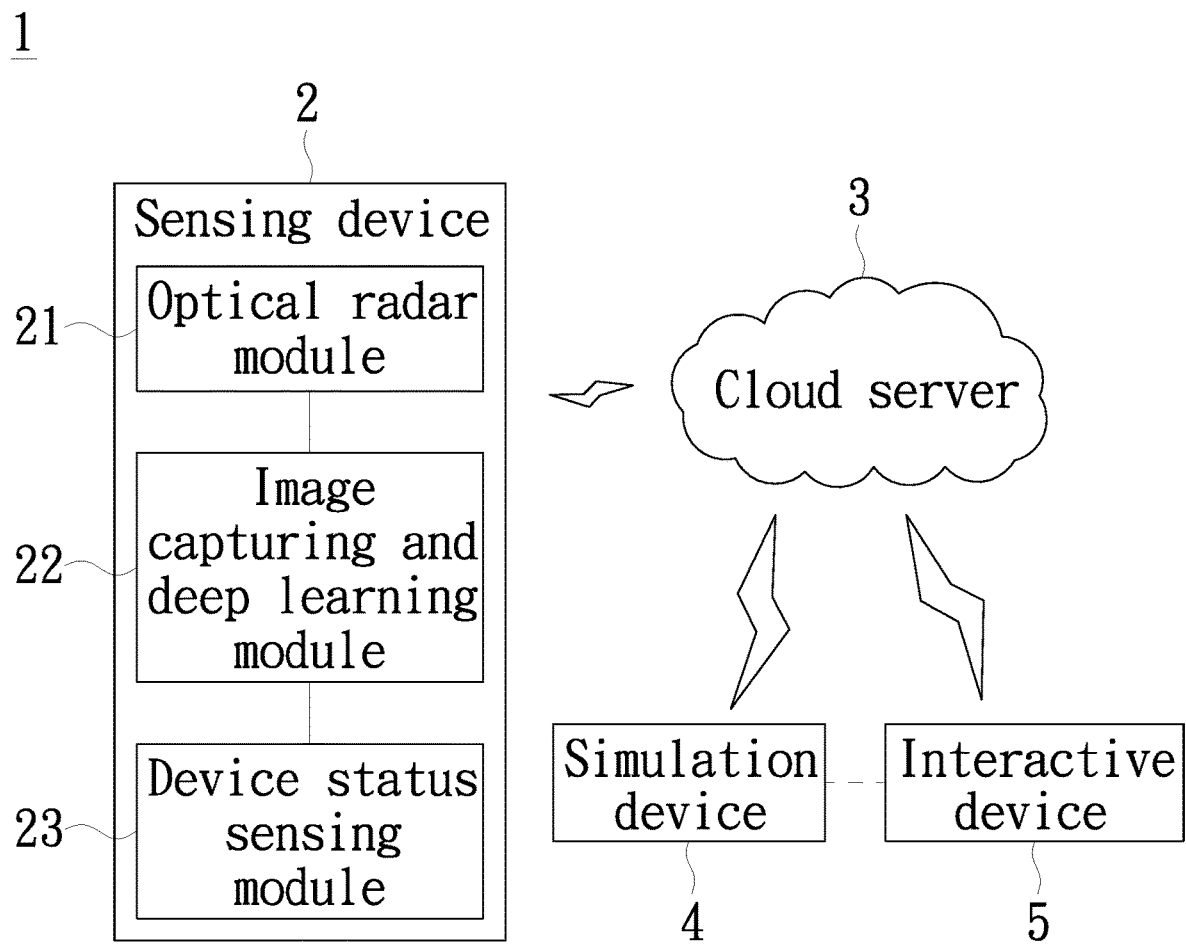

REALITY IMAGE RECONSTRUCTION SYSTEM

FIELD OF THE INVENTION

The present invention relates to an image reconstruction system, and more particularly, to a reality image reconstruction system for indoor reconstruction of an outdoor environment.

BACKGROUND OF THE INVENTION

Conventional virtual engines can only simulate the real outdoor environment into a virtual environment inside a room. All objects in the virtual environment are created by the virtual engine to immerse the user in the virtual environment. However, the virtual engine can neither achieve various environmental conditions of the real outdoor environment for the user, nor allow for actually experiencing the virtual interaction of various objects that could be encountered in the real outdoor environment.

SUMMARY OF THE INVENTION

The present invention provides a reality image reconstruction system which can realize various environmental parameters of the real outdoor environment encountered by users, and virtual interaction of various objects encountered in the actual experience of the real outdoor environment.

The present invention provides a reality image reconstruction system that comprises a sensing device, a cloud server, a simulation device, and an interactive device. The sensing device is arranged for sensing an outdoor environment and a plurality of objects therein, to generate environmental parameters of the outdoor environment and object parameters of said plurality of objects. The cloud server is linked to the sensing device, and is arranged to receive the environmental parameters of the outdoor environment, the object parameters of said plurality of objects, and movement parameters of the sensing device, to establish prediction parameters and physical parameters of said plurality of objects in the outdoor environment. The simulation device is linked to the cloud server, and is arranged to establish a virtual environment synchronized with the outdoor environment according to the environmental parameters of the outdoor environment, the object parameters, the prediction parameters, and the physical parameters of said plurality of objects. The interactive device is linked to the cloud server, and is arranged to realistically interact with said plurality of objects in the virtual environment according to the environmental parameters of the outdoor environment, the object parameters, the prediction parameters and the physical parameters of said plurality of objects, and the movement parameters of the sensing device.

According to an embodiment of the present invention, the sensing device comprises an optical radar module, an image capturing and deep learning module, and a device status sensing module. The optical radar module is arranged to sense the outdoor environment to generate environmental images of the outdoor environment. The image capturing and deep learning module is arranged to identify environmental parameters from environmental images of the outdoor environment, and identify said plurality of objects to generate object parameters of said plurality of objects. The device status sensing module is arranged to sense movement parameters of the sensing device.

According to an embodiment of the present invention, the environmental parameters of the outdoor environment comprises weather parameters, time parameters and road condition parameters.

According to an embodiment of the present invention, the object parameters of said plurality of objects comprise obstacle parameters, vehicle parameters and pedestrian parameters.

According to an embodiment of the present invention, the movement parameters of the sensing device comprise electric driving parameters, dynamic parameters, equipment condition parameters, position parameters, acceleration parameters and tilted angle parameters.

According to an embodiment of the present invention, the prediction parameters and the physical parameters of said plurality of objects comprises behavioral prediction parameters and relative positional relationship parameters.

According to an embodiment of the present invention, the simulation device is a display screen or a wearable glasses.

According to an embodiment of the present invention, realistically interacting with said plurality of objects in the virtual environment comprises driving control on the sensing device, and posture control and road resistance control on the interactive device.

According to an embodiment of the present invention, the sensing device is an automated guided vehicle (AGV), autonomous mobile robot (AMR), or electric vehicle.

According to an embodiment of the present invention, the interactive device is a flywheel simulator or an electric drive system.

The reality image reconstruction system of the present invention uses the sensing device to sense the outdoor environment and the objects therein, and provides the movement parameters of the sensing device in various environments that could be encountered in the outdoor environment, so that the simulation device may realistically present synchronized virtual environment to the user, and the interactive device may further realistically present virtual interaction of various objects, to facilitate the enhance the interactive experience for the user.

In order to make the above-mentioned and other objectives, features and advantages of the present invention more obvious and easier to understand, specific embodiments and the accompanied drawings are illustrated as follows.

BRIEF DESCRIPTION OF THE DRAWINGS

FIG. 1 is a diagram illustrating a reality image reconstruction system according to an embodiment of the present invention.

DETAILED DESCRIPTION OF PREFERRED EMBODIMENTS

Please refer to FIG. 1, which is a diagram illustrating a reality image reconstruction system according to an embodiment of the present invention. The reality image reconstruction system 1 provided by the present invention embodiment comprises a sensing device 2, a cloud server 3, a simulation device 4, and an interactive device 5. The cloud server 3 is linked to the sensing device 2, for example, via a wireless network, such as a 4G or 5G wireless communications network. However, the present invention is not limited to the above-mentioned types of linking methods. The simulation device 4 and the interactive device 5 is linked to the cloud server 3, and the linking method thereof may include wireless or wired methods, such as Ethernet, Wi-Fi, 4G, 5G, etc.

The present invention, however, is not limited to the above-mentioned types of linking methods.

The sensing device 2 is used to sense an outdoor environment and a plurality of objects therein, to generate the environmental parameters of the outdoor environment and the object parameters of a plurality of objects, wherein the sensing device 2 may be an automated guided vehicle (AGV), autonomous mobile robot (AMR), or electric vehicle. The sensing device 2 at least comprises an optical radar module 21, an image capturing and deep learning module 22, and a device status sensing module 23. The optical radar module 21 is arranged to sense an outdoor environment to generate environmental images of the outdoor environment. The image capturing and deep learning module 22 is arranged to identify environmental parameters of the outdoor environment from environmental images of the outdoor environment, and identify a plurality of objects to generate object parameters of a plurality of objects. The device status sensing module 23 is arranged to sense the movement parameters of the sensing device, wherein all the modules in the sensing device 2 may be implemented in hardware, software, or a combination thereof. In addition, for example, the device status sensing module 23 may comprise a gyroscope, in which the outdoor environment is an open space such as a region, a city, a suburb, etc. The environmental parameters of the outdoor environment at least comprise weather parameters such as the statistics of sunny day, rainy day, etc. The time parameters may comprise conditions of afternoon, evening, night, etc. The road condition parameters may comprises the conditions of smooth driving, traffic jam, traffic accident, uphill, downhill, etc., but the present invention is not limited to the above-listed environmental parameters. The plurality of objects in the outdoor environment may include obstacle parameters such as the conditions of separation islands, buildings, dead ends, etc., vehicle parameters such as statistics of trucks, vans, RVs, motorcycles, etc., and pedestrian parameters such as adults, children, pets, etc., but the present invention is not limited to the above-listed type of object parameters. The movement parameters of the sensing device 2 may include: electric drive parameters such as abnormal driving warning, driving data collecting, power allocation control, etc.; power parameters such as electricity, horsepower, torque, etc.; equipment status parameters such as battery temperatures, motor temperatures, motor controller temperatures, tire pressure, etc.; location parameters such as global positioning system (GPS) coordinates, Beidou satellite navigation system coordinates, etc.; acceleration parameters such as average acceleration, clockwise acceleration, etc.; and tilted angle parameters such as elevation angle, depression angle, etc. The present invention, however, is not limited to the above-listed types of movement parameters.

The cloud server 3 is arranged to receive environmental parameters, object parameters of a plurality of objects, and movement parameters of the sensing device 2 from the outdoor environment of the sensing device 2, to establish prediction parameters and physical parameters of a plurality of objects in the outdoor environment. The cloud server 3 is arranged to receive environmental parameters of the outdoor environment, object parameters of a plurality of objects and movement parameters of a sensing device 2 from the sensing device 2, to establish the prediction parameters and the physical parameters of the plurality of objects in the outdoor environment. The prediction parameters and physical parameters of a plurality of objects comprise at least the behavior prediction parameters such as the travel directions of pedestrians, the travel directions of vehicles, etc. The relative positional relationship parameters may comprise the relative distance between the sensing device 2 and a pedestrian (which may suggest approaching or departing of an object), and/or relative position such as relative coordinates, etc., but the present invention is not limited to the above-listed prediction parameters and physical parameters. In addition, the cloud server 3 may update the movement parameters of the sensing device 2 based on the environmental parameters of the outdoor environment, the object parameters of a plurality of objects, the prediction parameters and the physical parameters, and the movement parameters of the sensing device 2, so as to optimize the movement parameters of the sensing device 2, and further allow the sensing device 2 to perform following operations: driving assistances such as accurately measuring the relative position and speed between objects; adaptive patrol such as detecting the relative position and speed between moving objects; automatic emergency braking such as using inertial measurement units, gyroscopes, or GPS information to avoid collision; front vehicle collision warning such as collecting information through the control area network (CAN) bus to determine the triggering of warning sound/tactile signals; lane keeping/shifting such as calculating the relative position, angle, and speed between objects through images so as to keep/shift the lane of the vehicle; blind spot warning/lane shifting assist such as image creation of surrounding images of the entire vehicle; traffic sign identification such as image identification of traffic signals and signs; pedestrian and bicycle warnings such as image identification of pedestrians and bicycles; road hazard alerts such as broken bridges, flooding, landslides, road icing, and tunnel fires; road condition reminder such as the notifications of congestion, fog, poor visibility, etc.

The simulation device 4 is arranged to establish a virtual environment synchronized with the outdoor environment according to the environmental parameters, the object parameters of a plurality of objects, the prediction parameters, and the physical parameters of the outdoor environment. The simulation device 4 may be a display screen or wearable glasses that meets the purpose of allowing users to immerse themselves in this virtual environment to simultaneously implement various environmental parameters that can be encountered in the real outdoor environment, in order to increase the live experience.

The interactive device 5 is arranged to interact with a plurality of objects in the virtual environment according to the environmental parameters of the outdoor environment, the object parameters of a plurality of objects, the prediction parameters and the physical parameters, and the movement parameters of the sensing device 2, wherein the interactive device 5 may be a flywheel simulator or an electric drive system, for the user to experience the real outdoor environment presented by various environmental parameters when riding the flywheel simulator/electric drive system, and realistically interact with a plurality of objects via the interactive device 5. The operations of interactive device 5 comprise driving control on the sensing device 2, and posture control and road resistance control on the interactive device 5, so that the user can realistically interact with various objects encountered in the real outdoor environment when riding, so as to enhance the interactive experience.

That is, when the user is using the reality image reconstruction system 1 provided by the present invention, the user may synchronously experience the real outdoor environment in an indoor environment, thus realizing various environmental parameters that can be encountered by the user, and allow the user to actually experience the virtual interaction that can be encountered in a real outdoor environment. In an example, when being in an uphill path, the sensing device 2 may sense the environmental parameters of the real outdoor environment and the movement parameters of the sensing device 2, and the interactive device 5 (e.g., the flywheel simulator) ridden by the user will simultaneously adjust parameters to simulate the elevation angel of the posture of the user when riding on a uphill path, so as to make the user feel the resistance corresponding to the uphill so that the user can experience the realistic riding experience.

To sum up, the reality image reconstruction system of the present invention uses the sensing device to sense the outdoor environment and the objects therein, and provides the movement parameters of the sensing device in various environments that could be encountered in the outdoor environment, so that the simulation device may realistically present a synchronized virtual environment to the user, and the interactive device may further realistically present virtual interaction of various objects, to enhance the interactive experience for the user.

Although the present invention has been disclosed as the above, it is not meant to limit the scope of present invention. Those skilled in the art to which the present invention pertains may make slight changes and modifications without departing from the spirit of the present invention, the claimed scope of the present invention should be referred to what is defined in the appended claims.

What is claimed is:

1. A reality image reconstruction system, comprising:
   a sensing device for sensing an outdoor environment and a plurality of objects therein to generate environmental parameters of the outdoor environment and object parameters of said plurality of objects;
   a cloud server linked to the sensing device, and arranged to receive the environmental parameters of the outdoor environment, the object parameters of said plurality of objects, and movement parameters of the sensing device, to establish prediction parameters and physical parameters of said plurality of objects in the outdoor environment;
   a simulation device linked to the cloud server, and arranged to establish a virtual environment synchronized with the outdoor environment according to the environmental parameters of the outdoor environment, the object parameters, the prediction parameters, and the physical parameters of said plurality of objects; and
   an interactive device linked to the cloud server, and arranged to realistically interact with said plurality of objects in the virtual environment according to the environmental parameters of the outdoor environment, the object parameters, the prediction parameters and the physical parameters of said plurality of objects, and the movement parameters of the sensing device.

2. The reality image reconstruction system according to claim 1, wherein the sensing device comprises:
   an optical radar module arranged to sense the outdoor environment to generate environmental images of the outdoor environment;
   an image capturing and deep learning module arranged to identify environmental parameters from environmental images of the outdoor environment, and identify said plurality of objects to generate object parameters of said plurality of objects; and
   a device status sensing module arranged to sense movement parameters of the sensing device.

3. The reality image reconstruction system according to claim 1, wherein the environmental parameters of the outdoor environment comprises weather parameters, time parameters, and road condition parameters.

4. The reality image reconstruction system according to claim 1, wherein the object parameters of said plurality of objects comprise obstacle parameters, vehicle parameters, and pedestrian parameters.

5. The reality image reconstruction system according to claim 1, wherein the movement parameters of the sensing device comprise electric driving parameters, dynamic parameters, equipment condition parameters, position parameters, acceleration parameters, and tilted angle parameters.

6. The reality image reconstruction system according to claim 1, wherein the prediction parameters and the physical parameters of said plurality of objects comprises behavioral prediction parameters and relative positional relationship parameters.

7. The reality image reconstruction system according to claim 1, wherein the simulation device is a display screen or a wearable glasses.

8. The reality image reconstruction system according to claim 1, wherein the interactive device realistically interacting with said plurality of objects in the virtual environment comprises driving control on the sensing device, and posture control and road resistance control on the interactive device.

9. The reality image reconstruction system according to claim 1, wherein the sensing device is an automated guided vehicle (AGV), autonomous mobile robot (AMR), or electric vehicle.

10. The reality image reconstruction system according to claim 1, wherein the interactive device is a flywheel simulator or an electric drive system.

* * * * *